United States Patent
Saito et al.

(10) Patent No.: US 7,768,733 B2
(45) Date of Patent: Aug. 3, 2010

(54) METHOD FOR ERASING DATA FROM MAGNETIC TAPE STORAGE MEDIA

(75) Inventors: Kimya Saito, Kawasaki (JP); Kenichi Utsumi, Kawasaki (JP); Reisuke Nakagawa, Kawasaki (JP); Hitomi Akiyama, Kawasaki (JP); Ichirou Sakuma, Kawasaki (JP); Hiroyasu Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/176,363

(22) Filed: Jul. 8, 2005

(65) Prior Publication Data

US 2006/0209446 A1    Sep. 21, 2006

(30) Foreign Application Priority Data

Mar. 18, 2005    (JP) .............................. 2005-079851

(51) Int. Cl.
*G11B 5/03* (2006.01)
*G06F 3/06* (2006.01)

(52) U.S. Cl. ............................................ 360/66; 711/4
(58) Field of Classification Search ........................ None
See application file for complete search history.

(56) References Cited

U.S. PATENT DOCUMENTS

| | | | | |
|---|---|---|---|---|
| 4,819,087 | A * | 4/1989 | Takeuchi et al. | 386/54 |
| 5,926,607 | A * | 7/1999 | Oguro et al. | 386/95 |
| 6,101,070 | A * | 8/2000 | Oguro | 360/132 |
| 6,526,128 | B1 * | 2/2003 | Kermani | 379/88.22 |
| 2005/0251618 | A1 * | 11/2005 | Nonaka et al. | 711/103 |

FOREIGN PATENT DOCUMENTS

| | | |
|---|---|---|
| JP | 54-125016 | 9/1979 |
| JP | 4-157601 | 5/1992 |
| JP | 4-360001 | 12/1992 |
| JP | 8-129851 | 5/1996 |
| JP | 8-161748 | 6/1996 |
| JP | 9-147308 | 6/1997 |
| JP | 09147308 A * | 6/1997 |
| JP | 10247302 A * | 9/1998 |

OTHER PUBLICATIONS

Notice of Reasons for Rejection for corresponding Japanese Patent Application 2005-079851, dated Apr. 15, 2008.

* cited by examiner

*Primary Examiner*—Daniell L Negrón
(74) *Attorney, Agent, or Firm*—Staas & Halsey LLP

(57) ABSTRACT

Disclosed is a method, for erasing data from a magnetic tape storage medium (92) housed in a cartridge (86) containing a memory in which are stored the last written track position (yy) of the last written, most recent information and the last track position (xx) of past information written in the past and remaining unerased, comprising: the step of reading out of the memory (91) the last written track position of the most recent information and the last track position of the past information; the step (S124) of determining whether the data should be erased up to the last written track position of the most recent information or up to the last track position of the past information; and the step (S126, S128) of erasing the data up to the determined position, thereby shortening the data erase time of the magnetic tape while completely solving a security problem by making provisions to completely erase the data of the most recently written information or the data of the past information written in the past and remaining unerased.

7 Claims, 7 Drawing Sheets

```
ERASE PROCESSING SELECTION
  1. WRITTEN TRACK POSITION: xx
  2. EOD WRITTEN TRACK POSITION: yy

SELECT PROCESSING
```

METHOD FOR ERASING DATA FROM MAGNETIC TAPE STORAGE MEDIA

CROSS-REFERENCE TO RELATED APPLICATIONS

This application is based upon and claims the priority of Japanese Patent Application No. 2005-079851, filed on Mar. 18, 2005, the contents being incorporated herein by reference.

BACKGROUND OF THE INVENTION

1. Field of the Invention

The present invention relates to a method for erasing data from magnetic tape storage media and, more particularly, to a security-erase processing method for preventing data leakage from magnetic tape storage media in a magnetic tape library apparatus.

2. Description of the Related Art

Cartridge magnetic tapes are still used as backup recording media in a computer system. This is because cartridge magnetic tapes have a storage capacity of 400 gigabytes or larger per reel of tape and the per-bit recording cost is inexpensive compared with other types of recording media.

One method for completely erasing data from a magnetic tape storage medium is to cut the magnetic tape storage medium into pieces. However, once cut into pieces, the magnetic tape recording medium can no longer be reused. Another method is to magnetically write meaningless data over the recorded contents of the magnetic tape recording medium, but since the magnetic tape recording medium has a servo track for storing control information to control the apparatus, if the tape is magnetically erased, the control information is also erased; in this case also, the magnetic tape recording medium can no longer be reused.

A method for performing data security erase processing is known from the prior art. This method will be explained with reference to FIGS. 1 to 3.

Figure 1:
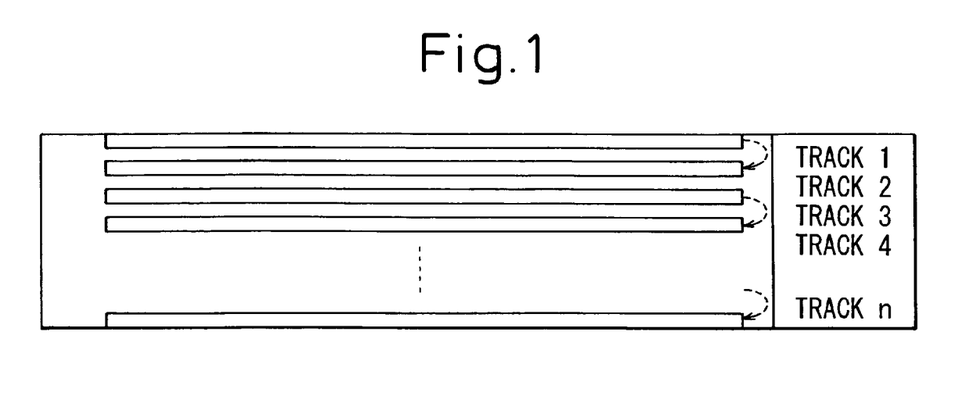
FIG. 1 is a diagram showing tracks on a magnetic tape storage medium wound around a reel.

FIG. 1 is a diagram showing tracks on a magnetic tape storage medium wound around a reel. As shown, there are a plurality of tracks 1 to n for storing data.

Figure 2:
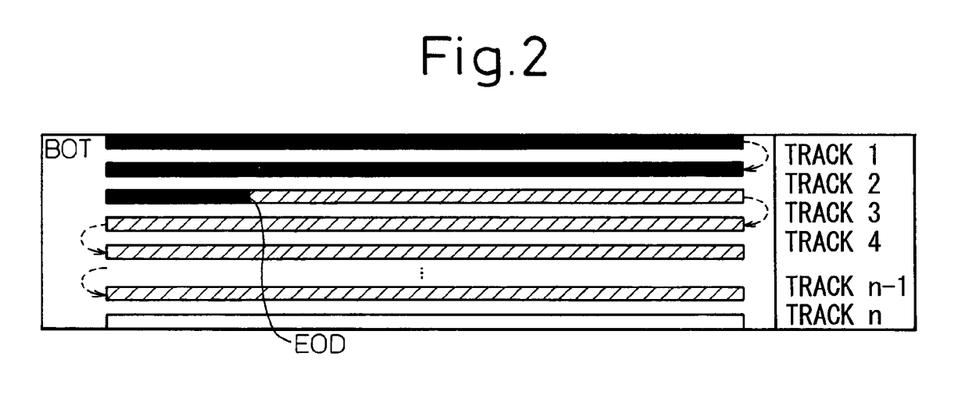
FIG. 2 is a diagram showing a condition in which data has been written from the beginning of track 1 to an intermediate point along track 3 on the magnetic tape storage medium shown in FIG. 1.

FIG. 2 is a diagram showing a condition in which data has been written from the beginning of track 1 to an intermediate point along track 3 on the magnetic tape storage medium shown in FIG. 1. In FIG. 2, the tracks shown in black are the tracks where data is last written, and the tracks indicated by oblique lines are the tracks filled with data written in the past but remaining unerased. The start position of the written data is recorded as a BOT (Beginning of the Tape) on the recording medium to be described later, while the end position of the written data is recorded as an EOD (End of Data) on the recording medium.

Figure 3:
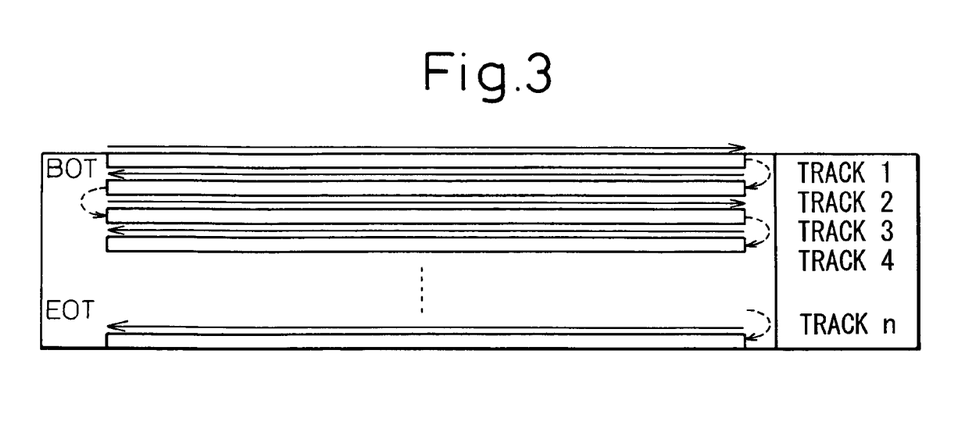
FIG. 3 is a diagram for explaining a prior art data erase method.

FIG. 3 is a diagram for explaining a prior art data erase method. In the prior art method shown here, to erase all data excluding the control data on all the tracks, each track has had to be overwritten with meaningless data by performing data-security erase processing. However, as the storage capacity of the media increases, nowadays it takes a few hours per reel of magnetic tape to complete this processing, which is not practical. In particular, as the processing is also performed on portions not recorded with data, the processing time increases correspondingly.

On the other hand, in some traditionally practiced data erase methods, it is decided that the data has been erased by simply writing a file mark for each track from the beginning of the magnetic tape by using backup software or the like. With such methods, however, data that follows the file mark on each track actually remains unerased, and this poses a problem from the standpoint of security.

SUMMARY OF THE INVENTION

An object of the present invention is to drastically reduce the data erase time by making provisions to erase data from the beginning of the magnetic tape up to the last track position of the actually written data.

Another object of the present invention is to completely solve the security problem by making provisions to be able to completely erase any data whether it be the data of the most recently written information or the data of past information written in the past and remaining unerased.

To achieve the above objects, according to a first mode of the present invention, there is provided a method for erasing data from a magnetic tape storage medium housed in a cartridge containing a memory in which are stored the last written track position of the last written, most recent information and the last track position of past information written in the past and remaining unerased, the method comprising the steps of: reading out of the memory the last written track position of the most recent information and the last track position of the past information; determining whether the data should be erased up to the last written track position of the most recent information or up to the last track position of the past information; and erasing the data up to the determined position.

Preferably, the method further comprises, between the reading step and the determining step, the step of presenting the last written track position of the most recent information and the last track position of the past information for viewing on a display, wherein, in the determining step, it is determined from the display whether the data should be erased up to the last written track position of the most recent information or up to the last track position of the past information.

Preferably, the memory is a nonvolatile memory.

In this way, since provisions are made to determine whether the data should be erased up to the last written track position of the most recent information or up to the last track position of the past information by presenting the track positions read out of the memory for viewing, the erase processing can be performed only on the tracks where data, that must be erased, is recorded; this eliminates the need to perform the erase processing on tracks where data is not recorded, and serves to drastically reduce the data erase processing time.

Furthermore, as the data that needs to be erased is completely erased, a security problem, as encountered in the prior art, does not arise.

DESCRIPTION OF THE PREFERRED EMBODIMENTS

Figure 4:
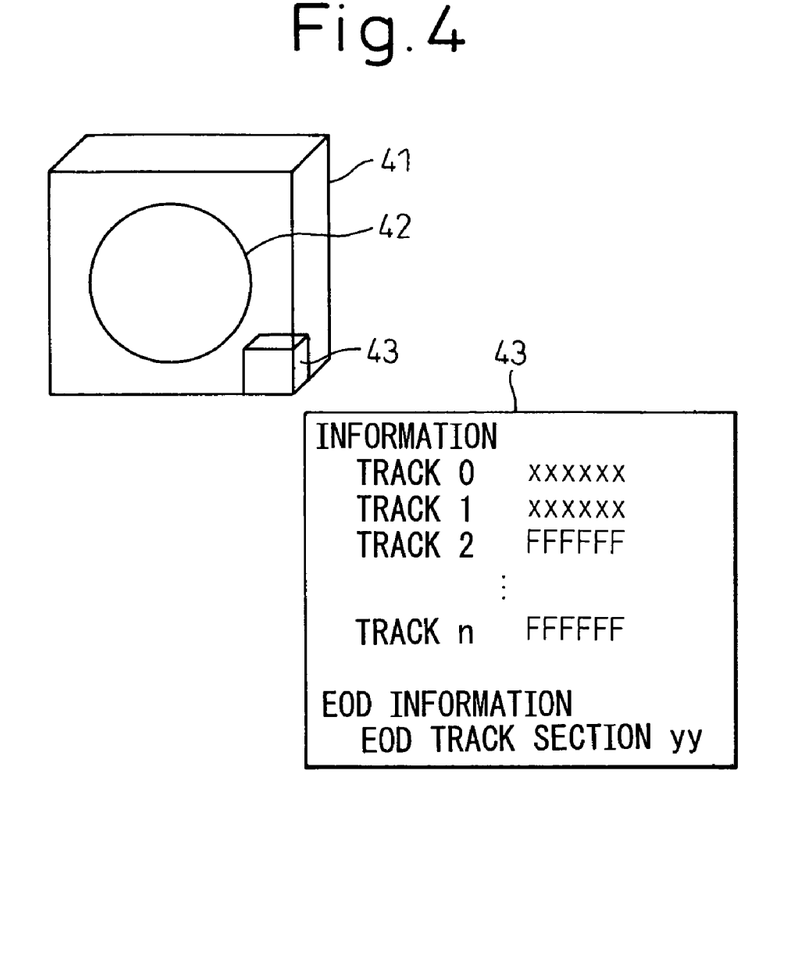
FIG. 4 is a diagram showing the contents of a nonvolatile memory contained in a cartridge in which a magnetic tape storage medium wound around a reel is housed.

The following describes a method for erasing data from a magnetic tape storage medium according to an embodiment of the present invention. FIG. 4 is a diagram showing the contents of a nonvolatile memory contained in a cartridge in which a magnetic tape storage medium wound around a reel is housed. In the figure, reference numeral 41 indicates the cartridge, 42 the magnetic tape storage medium, and 43 the nonvolatile memory. The nonvolatile memory 43 stores information indicating for each of the data tracks 0 to n on the magnetic tape recording medium 42 whether the track is a data written region xxx . . . in which data is already written or a nonwritten region FFF . . . in which data is not written yet, and an EOD track section as EOD information indicating the last written track position of the last written, most recent information.

Figure 5:
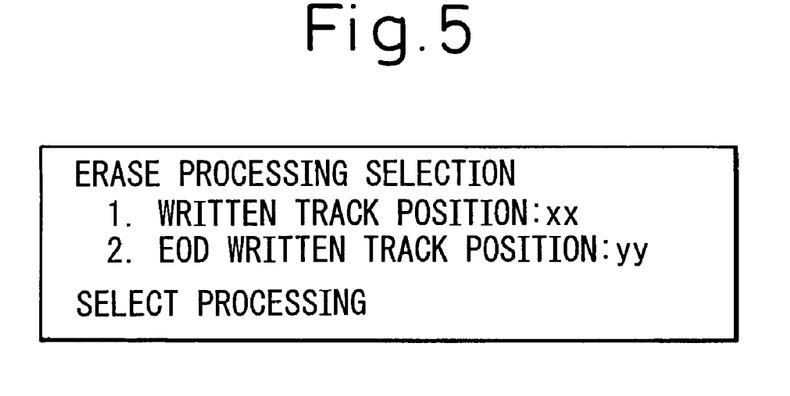
FIG. 5 is a diagram showing an erase processing selection screen according to an embodiment of the present invention.

FIG. 5 is a diagram showing an erase processing selection screen according to the embodiment of the present invention. As shown, when starting the erase processing, (1) the last track position "xx" of the written data and (2) the EOD track number "yy" indicating the last written track position of the last written, most recent information are presented for viewing on a display. In the example of FIG. 2, "xx" is n-1 and "yy" is 3. The operator selects either one of the two options for the erase processing.

Figure 6:
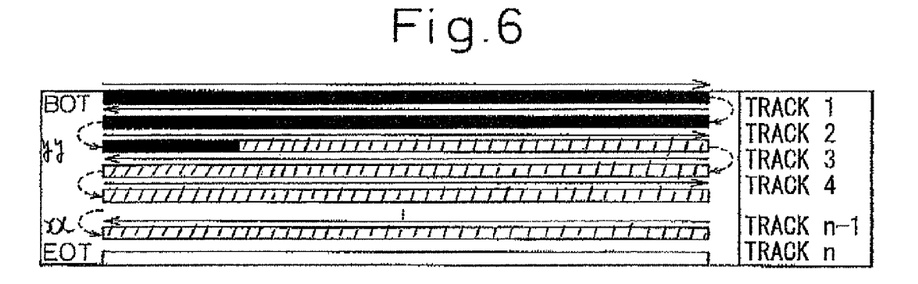
FIG. 6 is a diagram showing an example of how data up to the last track position of the past information written in the past and remaining unerased is erased according to the embodiment of the present invention.

FIG. 6 is a diagram showing an example of how data up to the last track position of the past information written in the past and remaining unerased is erased according to the embodiment of the present invention. That is, this example shows the case where the erase processing (1) is selected from the screen shown in FIG. 5. As shown by arrows in the figure, meaningless data is overwritten to track 1 to track n-1 in sequence to erase the original data. As the erase processing is not performed on track n, the time required for the erase processing is shortened compared with the prior art method. In the example FIG. 6, data is written up to track n-1, but as the number of tracks where data is written is smaller, the erase time becomes shorter. EOT in the figure indicates the last track number of the magnetic tape.

Figure 7:
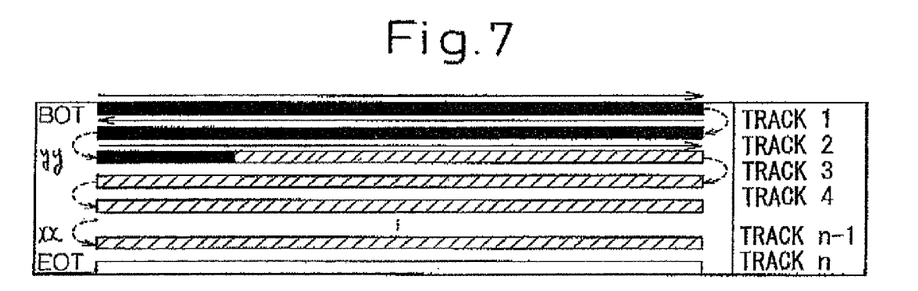
FIG. 7 is a diagram showing an example of how data up to the last written track position of the last written, most recent information is erased according to the embodiment of the present invention.

FIG. 7 is a diagram showing an example of how data up to the last written track position of the last written, most recent information is erased according to the embodiment of the present invention. That is, this example shows the case where the erase processing (2) is selected from the screen shown in FIG. 5. As the track position "yy" at which the EOD is written is 3 in this example, the erase processing starts with track 1 and ends with track 3 as shown by arrows in the figure. Data from track 4 to track n-1 is not erased, but this does not present any security problem because, in this case, the operator has selected the processing (2) from the screen of FIG. 5 by judging that there would be no problem from the standpoint of security.

Figure 8:
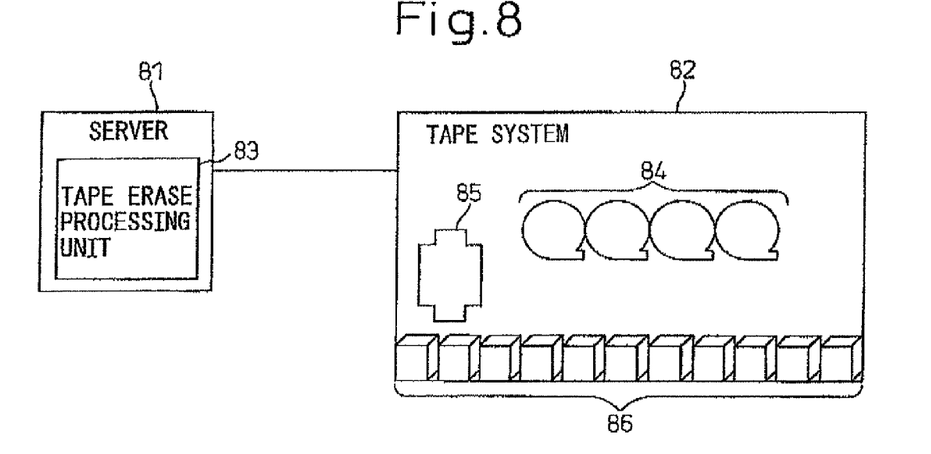
FIG. 8 is a block diagram showing the entire configuration of a magnetic tape storage media system according to the embodiment of the present invention.

FIG. 8 is a block diagram showing the entire configuration of a magnetic tape storage media system according to the embodiment of the present invention. As shown, the magnetic tape storage media system comprises a server 81 and a magnetic tape system 82 connected to it. The server 81 contains a magnetic tape erase processing unit 83. The magnetic tape system 82 comprises drives 84, a robot 85, and cartridges 86 holding magnetic tape recording media.

In operation, the robot 85 under control of the magnetic tape erase processing unit 83 moves a selected one of the cartridges 86 to one of the drives 84, to initiate the erase processing.

Figure 9:
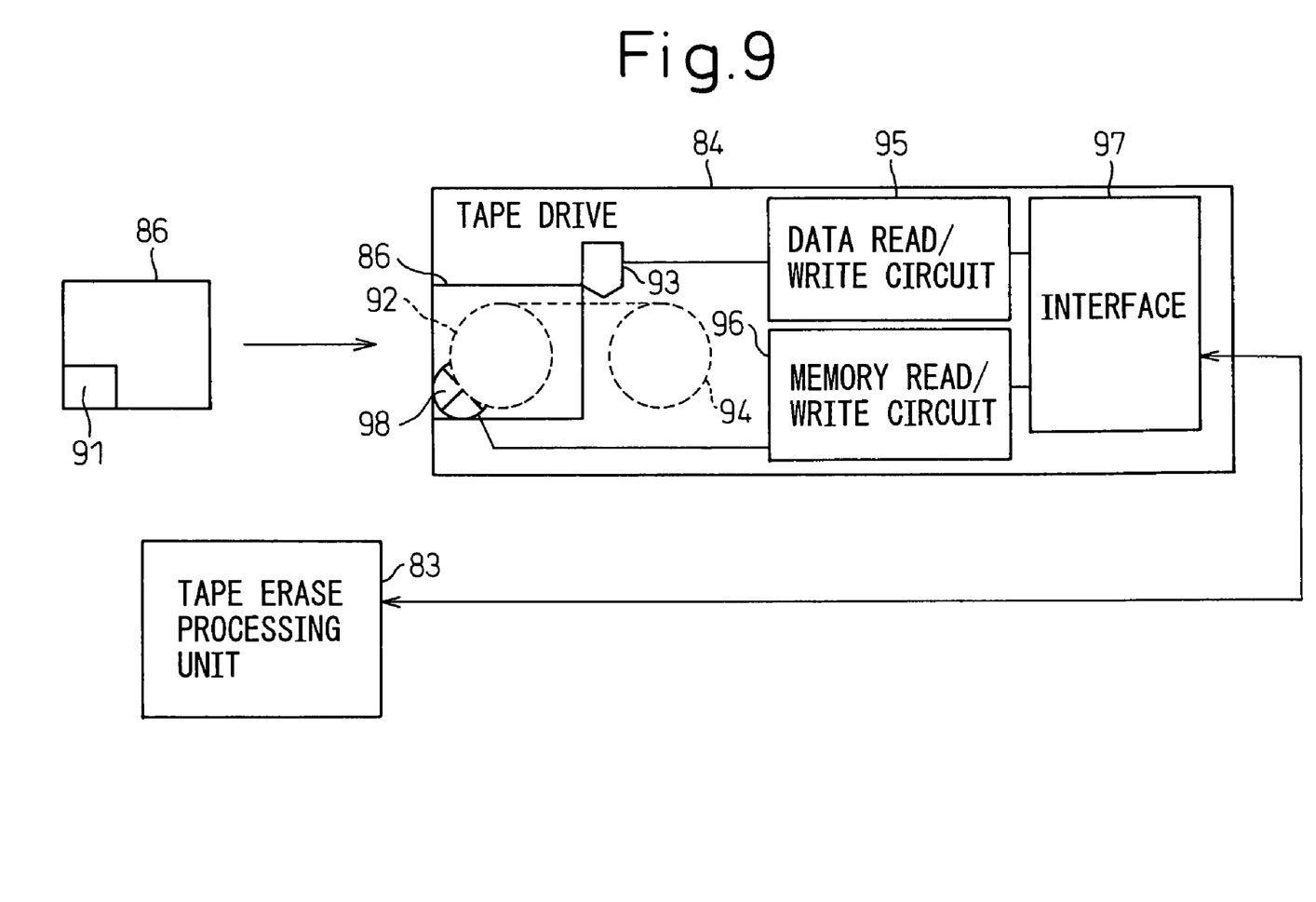
FIG. 9 is a block diagram showing the entire configuration of the magnetic tape storage media system according to the embodiment of the present invention before the magnetic tape storage medium is loaded.

FIG. 9 is a block diagram showing the entire configuration of the magnetic tape storage media system according to the embodiment of the present invention before the magnetic tape storage medium is loaded. In the figure, reference numeral 91 is the nonvolatile memory contained in the cartridge 86, 92 is the magnetic tape recording medium, 93 is a read or write head, 94 is a take-up reel, 95 is a data read/write circuit, 96 is a memory read/write circuit, 97 is an interface, and 98 is a cartridge memory interface.

Before the cartridge 86 is loaded into the drive 84, the cartridge 86 is located at some distance away from the drive 84, but when it is loaded, the cartridge 86 is placed in the drive 84 by the robot 85.

Figure 10:
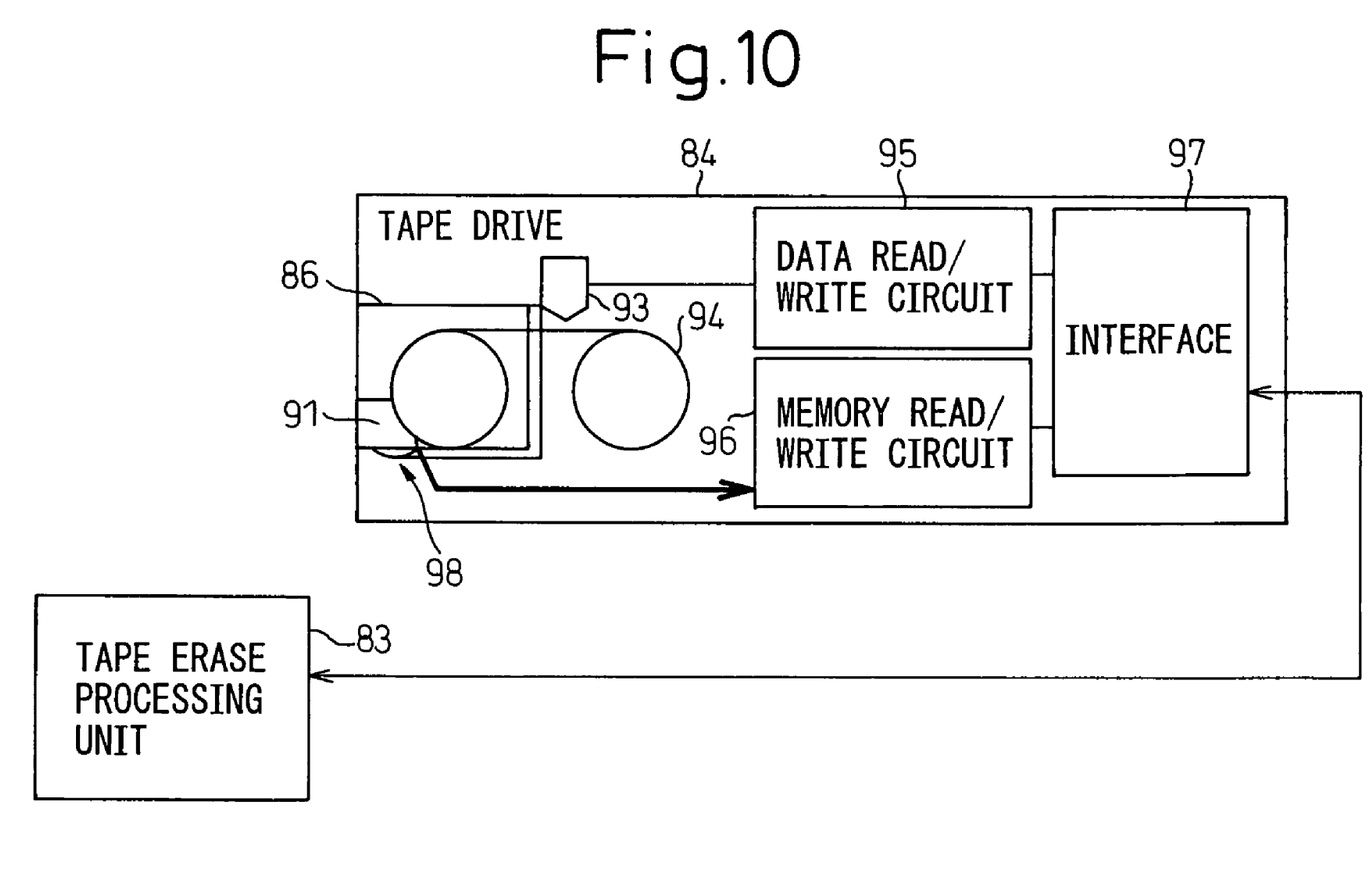
FIG. 10 is a block diagram for explaining the operation of the magnetic tape storage media system according to the embodiment of the present invention when the magnetic tape storage medium is loaded.
Figure 11:
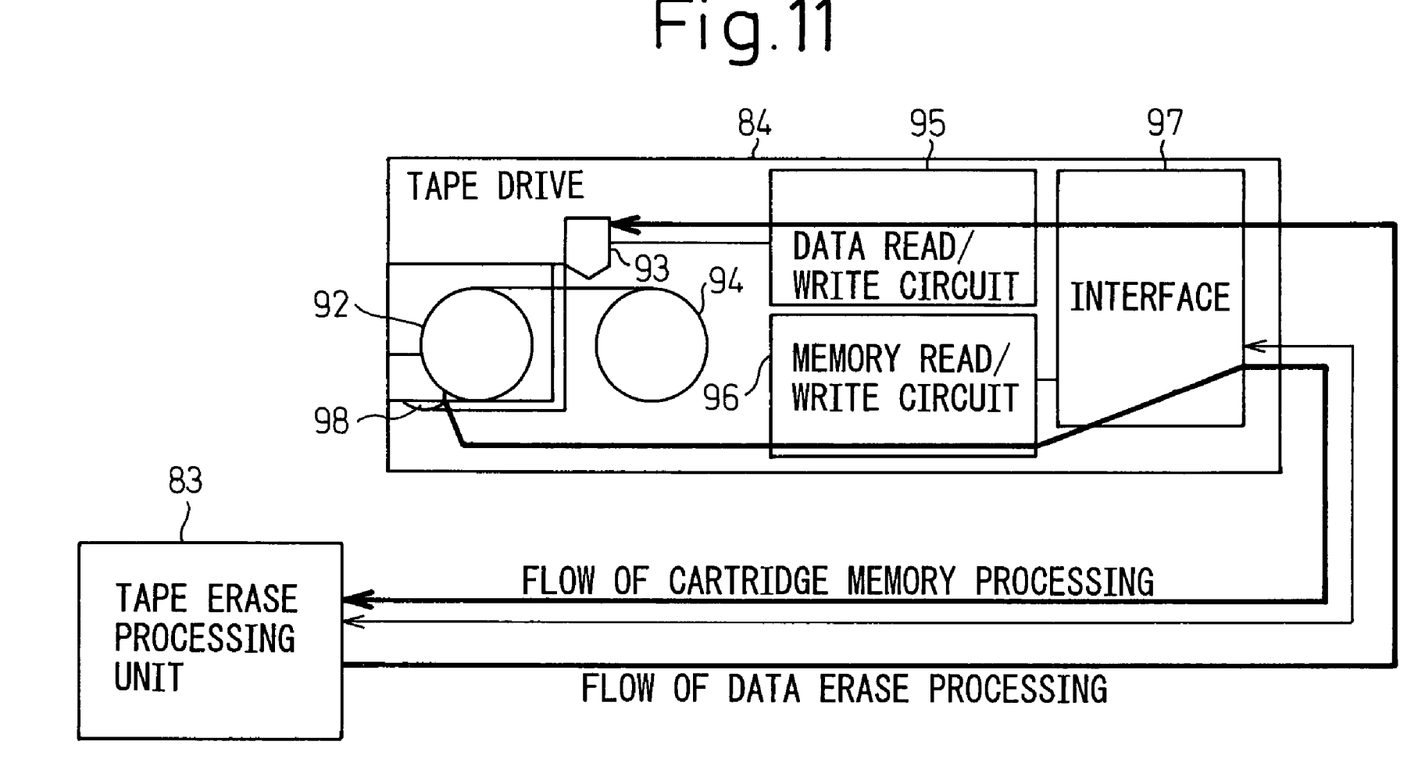
FIG. 11 is a block diagram for explaining the operation of the magnetic tape storage media system according to the embodiment of the present invention when erasing data recorded on the magnetic tape storage medium.

FIGS. 10 and 11 are block diagrams for explaining the operation of the magnetic tape storage media system according to the embodiment of the present invention when the magnetic tape storage medium is loaded. When the cartridge 86 is loaded into the drive 84 as shown in the diagrams, the contents of the nonvolatile memory 91 are read into the memory read/write circuit 96 via the cartridge memory interface 98. After that, the tape erase processing is performed in accordance with the contents read out of the nonvolatile memory 91 by transferring signals between the magnetic tape erase processing unit 83 and the data read/write circuit 95 and memory read/write circuit 96 via the interface 97.

Figure 12:
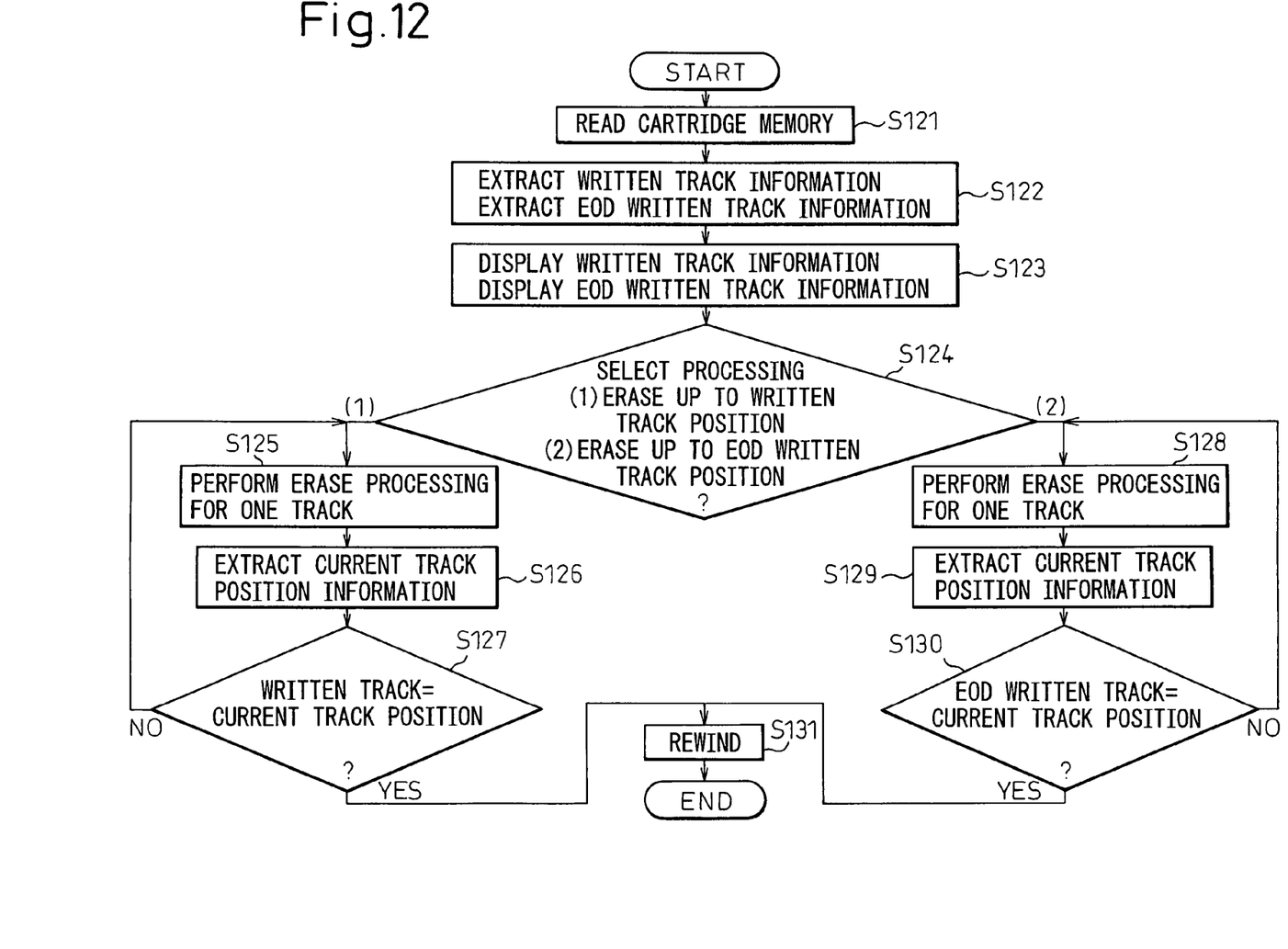
FIG. 12 is a flowchart for explaining the operation of the magnetic tape storage media system according to the embodiment of the present invention when erasing data recorded on the magnetic tape storage medium.

FIG. 12 is a flowchart for explaining the operation of the magnetic tape storage media system according to the embodiment of the present invention when the magnetic tape storage medium is loaded. In the flowchart, in step S121 the memory read/write circuit 96 reads out the information stored in the nonvolatile memory 91 in the cartridge 86. Next, in step S122, the memory read/write circuit 96 extracts the last track position "xx" of the written data and the track information "yy" indicating the track where the EOD is written. Then, in step S123, the last track position "xx" of the written data and the EOD-written track information "yy" are presented for viewing on the display (not shown).

In step S124, while viewing the information presented on the display, a decision is made as to whether the data should be erased (1) up to the last track "xx" of the written data or (2) up to the EOD-written track "yy".

If it is decided to erase the data up to the last track "xx" of the written data (1), the process proceeds to step S125 where the data read/write circuit 95 performs the erase processing for one track. Next, in step S126, the current track position information is extracted to extract the write position, and the processing from step S125 to S127 is repeated until the write position matches the current track position, thereby erasing the data on all the remaining tracks. In this case, the erase processing is performed on all the written tracks xxx . . . including not only the most recent data but also the past data.

On the other hand, if it is decided to erase the data up to the EOD track information "yy" (2), the process proceeds to step S128 where the erase processing is performed for one track; next, in step S129, the current track position information is extracted to extract the write position, and the processing from step S128 to S130 is repeated until the write position matches the current track position, thereby erasing the data on all the remaining tracks. In this case, only the most recently written data is erased.

After completing the erase processing (1) or (2), the magnetic take is rewound on the take-up reel 94 in step S131 and the process is terminated.

In the prior art, as the entire tape was erased irrespective of the amount of written data, it took an extremely long time to complete the process, but according to the erase processing (1) of the present invention, all the written data including the past data can be erased from the magnetic tape. Accordingly, all the contents of the media repeatedly used in the same department within a company, for example, can be erased including all the past data recorded thereon, and the media can thus be put in a condition that does not present any security problem.

Further, according to the erase processing (2) of the present invention, only the data last written in a continuous series of operations can be erased. That is, the most recent data can be erased. This type of processing can be used in such cases as when media are exchanged between a certain department within a company and a data center or the like and when only the data concerning that department needs to be erased.

Usually, in this case, the erase processing can be accomplished in a shorter time than the above processing (1), and thus the erase time can be further shortened.

What is claimed is:

1. A method for erasing data, that must be erased for ensuring security, from a magnetic tape storage medium, housed in a cartridge, containing a memory in which are stored the last written track position of the last written, most recent data and the last track position of past data written in the past and remaining unerased, said method comprising:

reading out of said memory, before overwriting data onto said magnetic tape storage medium, the last written track position of said most recent data and the last track position of said past data;

selecting, based on an instruction from a user, a final position, up to which said magnetic tape storage medium should be erased, from either one of the last written track position of said most recent data and the last track position of said past data; and erasing, by overwriting meaningless data, said data on said magnetic tape storage medium from the beginning of the magnetic tape storage medium up to said selected final position.

2. The method for erasing data from a magnetic tape storage medium as claimed in claim 1, further comprising, between said reading and said selecting, presenting the last written track position of said most recent data and the last track position of said past data for viewing on a display, wherein in said selecting, it is determined from said display whether said data on said magnetic tape storage medium should be erased up to the last written track position of said most recent data or up to the last track position of said past data.

3. The method for erasing data from a magnetic tape storage medium as claimed in claim 1, wherein said memory is a nonvolatile memory.

4. The method for erasing data from a magnetic tape storage medium as claimed in claim 1, wherein a traveling direction of the magnetic tape storage medium is in parallel with the data writing or erasing direction.

5. The method for erasing data from a magnetic storage medium as claimed in claim 1, wherein the last written track position of the most recent data and the last track position of said past data are displayed on a display.

6. A method for erasing data from a magnetic tape storage medium, comprising:

determining a last written track position of most recent data and a last track position of past data before overwriting data onto the magnetic tape storage medium;

selecting whether data on the magnetic tape storage medium should be erased up to the last written track position of the most recent data, or up to the last track position of the past data, said selecting being performed by an instruction from a user; and erasing, by overwriting meaningless data, the data on the magnetic tape storage medium from the beginning of the magnetic tape storage medium up to the selected position.

7. The method for erasing data from a magnetic tape storage medium as claimed in claim 6, wherein the last written track position of the most recent data and the last track position of said past data are displayed on a display.

* * * * *

UNITED STATES PATENT AND TRADEMARK OFFICE
CERTIFICATE OF CORRECTION

| | | |
|---|---|---|
| PATENT NO. | : 7,768,733 B2 | Page 1 of 1 |
| APPLICATION NO. | : 11/176363 | |
| DATED | : August 3, 2010 | |
| INVENTOR(S) | : Kinya Saito et al. | |

It is certified that error appears in the above-identified patent and that said Letters Patent is hereby corrected as shown below:

On the Title Page, item [75], delete "Kimya Saito" and insert --Kinya Saito--.

Signed and Sealed this

Twenty-eighth Day of December, 2010

David J. Kappos
*Director of the United States Patent and Trademark Office*